United States Patent
Alghunaimi et al.

(10) Patent No.: US 11,148,962 B2
(45) Date of Patent: Oct. 19, 2021

(54) TREATING DESALTER WATER EFFLUENT FOR WASH WATER REUSE IN A GOSP USING A CERAMIC NANOFILTRATION MEMBRANE

(71) Applicant: Saudi Arabian Oil Company, Dhahran (SA)

(72) Inventors: Fahd Ibrahim Alghunaimi, Dhahran (SA); Young Chul Choi, Dhahran (SA); Regis Didier Alain Vilagines, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 36 days.

(21) Appl. No.: 16/787,866

(22) Filed: Feb. 11, 2020

(65) Prior Publication Data
US 2021/0246051 A1 Aug. 12, 2021

(51) Int. Cl.
*B01D 61/02* (2006.01)
*B01D 71/02* (2006.01)
(Continued)

(52) U.S. Cl.
CPC ............ *C02F 1/442* (2013.01); *B01D 61/027* (2013.01); *B01D 71/02* (2013.01); *C10G 31/08* (2013.01);
(Continued)

(58) Field of Classification Search
CPC ... B01D 61/027; C02F 1/442; C02F 2103/365
See application file for complete search history.

(56) References Cited

U.S. PATENT DOCUMENTS

| | | | | |
|---|---|---|---|---|
| 6,159,374 A | * | 12/2000 | Hart | C10G 31/08 208/251 R |
| 7,452,390 B1 | * | 11/2008 | Al-Khalifa | F17C 7/02 137/13 |

(Continued)

FOREIGN PATENT DOCUMENTS

WO WO2004076041 9/2004

OTHER PUBLICATIONS

Ahmed et al., "Saudi Aramco drives technological initiatives for groundwater conservation in oil & gas production facilities," IPTC 20086, Presented at the International Petroleum Technology Conference, Dhahran, Saudi Arabia, Jan. 13-15, 2020; International Petroleum Technology Conference, 2020, 14 pages.

(Continued)

*Primary Examiner* — Bradley R Spies
(74) *Attorney, Agent, or Firm* — Fish & Richardson P.C.

(57) ABSTRACT

Systems and methods include a Gas and Oil Separation Plant (GOSP)-embedded treatment system for recycling desalter wash water. The system includes: 1) an inlet system providing an inlet stream of desalter water effluent received from at least one desalter of a source; 2) a filtering system in the GOSP including a nanofiltration (NF) membrane configured to filter the desalter water effluent to attain filtered desalter water effluent within a pre-determined wash water threshold for wash water reuse, including: partially desalinating the desalter water effluent to attain a Total Dissolved Solids (TDS) of the desalter water effluent within a pre-determined TDS threshold; and 3) a pump system configured to pump the desalter water effluent through the NF membrane and pump the filtered desalter water effluent to a supply line of the desalter.

10 Claims, 6 Drawing Sheets

(51) Int. Cl.
  *C02F 1/44* (2006.01)
  *C02F 103/36* (2006.01)
  *C10G 31/08* (2006.01)
  *C10G 33/06* (2006.01)
(52) U.S. Cl.
  CPC .......... *C10G 33/06* (2013.01); *B01D 2325/20* (2013.01); *C02F 2103/365* (2013.01); *C02F 2209/001* (2013.01); *C02F 2209/006* (2013.01)

(56) References Cited

U.S. PATENT DOCUMENTS

| | | | |
|---|---|---|---|
| 8,426,333 | B2 | 4/2013 | Bishop et al. |
| 8,431,508 | B2 | 4/2013 | Bishop et al. |
| 2002/0185439 | A1* | 12/2002 | Wessels ............... B01D 61/027 210/636 |
| 2012/0255904 | A1* | 10/2012 | Nagghappan ............ C02F 9/00 210/638 |
| 2013/0233786 | A1* | 9/2013 | Posa ..................... E21B 21/063 210/259 |
| 2015/0376033 | A1 | 12/2015 | Tao et al. |
| 2019/0100703 | A1 | 4/2019 | Koleshwar et al. |
| 2019/0135671 | A1 | 5/2019 | Banks et al. |

OTHER PUBLICATIONS

Chen et al., "Novel pore size tuning method for the fabrication of ceramic multi-channel nanofiltration membrane," Journal of Membrane Science, 2018, 552: 77-85.

Da et al., "Preparation of zirconia nanofiltration membranes through an aqueous sol-gel process modified by glycerol for the treatment of wastewater with high salinity," Journal of Membrane Science, 2016, 504: 29-39.

Guo et al., "Fabrication and characterization of TiO2/ZrO2 ceramic membranes for nanofiltration," Microporous and Mesoporous Materials, Apr. 2018, 360: 125-131.

Kaplan et al., "Assessment of desalination technologies for treatment of a highly saline brine from a potential CO2 storage site," Desalination, Feb. 2017, 404: 87-101.

Richter [online], "Current Research: NF-Membranes for the cleaning of "Recycle Water" in oil sand extractions," Fraunhofer Department of Nanoporous Membranes, 2019, [retrieved o Dec. 24, 2019], retrieved from: URL <https://www.ikts.fraunhofer.de/en/departments/environmental_process_engineering/nanoporous_membranes/zeolite_membranes_nanocomposites/cr_nf_membranes_for_cleaning.html>, 3 pages.

Song et al., "TiO2 nanofiltration membranes prepared by molecular layer deposition for water purification," Journal of Membrane Science, Jul. 2016, 510: 72-78.

Veoliawatertechnologies.com [online], "OPUS® Technology: Overview," Veolia Products Listing, 2019, [retrieved on Dec. 24, 2019], retrieved from: URL <https://www.veoliawatertechnologies.com/en/solutions/products/opus-technology>, 4 pages.

Zeidler et al., "Preparation and Characterization of New Low MWCO Ceramic Nanofiltration Membranes for Organic Solvents," Journal of Membrane Science, 2014, 470: 421-430.

Zeidler et al., "New Ceramic Membranes for Organic Solvent Nanofiltration with a Molecular Weight Cut-Off < 500 Da," Procedia Engineering, Jan. 2012, 44: 646-648.

PCT International Search Report and Written Opinion in International Appln. No. PCT/US2021/017048, dated May 18, 2021, 17 pages.

Dadari et al., "Crude oil desalter effluent treatment using high flux synthetic nanocomposite NF membrane-optimization by response surface methodology," Desalination, Elsevier, Amsterdam, NL, Sep. 2015, 377: 34-46, XP029287214, 13 pages.

* cited by examiner

TREATING DESALTER WATER EFFLUENT FOR WASH WATER REUSE IN A GOSP USING A CERAMIC NANOFILTRATION MEMBRANE

BACKGROUND

The present disclosure applies to treating desalter water effluent, for example, in the oil industry. Conventional desalters in Gas and Oil Separation Plants (GOSPs) typically use fresh water to desalt produced oil streams. Currently, desalters in GOSPs are used to reduce the salt content of oil to prepare the oil for shipment or refineries. Desalter processes require significant amounts of fresh water, a resource which is becoming scarcer worldwide. This will increase the cost of production of crude oil as it creates greater operating costs. The desalter water effluent is generally re-injected or disposed of without reuse, due to high operational and maintenance costs associated with conventional water treatment methodologies.

Conventional treatment systems that are used to treat water may include complex multi-process configurations. The footprint of such systems can be limited to accommodate operational needs, and overall maintenance costs can be a burden for a plant. Conventional systems that rely on Reverse Osmosis (RO) for desalination can suffer from limitations associated with thermal limits, petrochemical compatibilities, dehydration risk, and extreme sensitivity to oxidizing chemicals. Conventional desalination techniques using polymer-based filters have inherent issues with produced water that inhibits their wide acceptance and use by the oil industry. Commercially available polymeric nanofiltration (NF) and RO membranes cannot withstand temperatures or the presence of organic contaminants. As a consequence, water cooling and separation facilities are needed for these technologies to be used with feed water coming from crude oil desalters. Even with such additional equipment, these techniques can tend to fail frequently.

Some conventional systems use mechanical vapor compressor (MVC) technology for high Total Dissolved Solids (TDS) desalination. MVCs typically can treat high TDS water, but the technology typically has high initial capital expenditure (CAPEX) and operating costs (OPEX). Also, the technology requires a significant amount of cooling, and auxiliary boilers are often required where excess steam is not available for the start-up.

Reducing both TDS and organics in conventional systems can include processes that requires ultrafiltration (UF), air stripper, cooling system, and RO. However, polymer-based NF and RO used in general water treatment and desalination are not favorable to treat produced water or waste water from oil and gas processing facilities. This is because of the low temperature tolerance (maximum 40° C.) of the polymer based membranes which is much less than the typical temperature of produced water at 50-70° C. As a result, it is necessary to install cooling towers upstream of the NF or RO. Also, organic contaminants in produced water have been found to damage the polymer structure of the membrane, making the life span of membranes much shorter than typical use in general water treatment. The low tolerance of polymer material to organic material in the produced water causes frequent replacement of the membranes. As a result, the reuse of any produced water for beneficial purposes becomes costly due to the pre-treatment requirements, and fresh water needs to be continuously provided in the desalter.

NF and RO based on polymers typically cannot tolerate even 1 part per million (ppm) of chlorine or other oxidizing agents. This makes the cleaning and removal of organics fouling and bio-fouling layer challenging, such as requiring cleaning using only high pH (per-Hydrogen) or low pH solutions at warm temperatures (for example, less than 40° C.). Another problem is that polymer-based membranes can suffer a collapse of their structures if the membranes are allowed to dry up. This can happen, for example, when operations are suspended for an extended period of time. As such, in addition to fouling and scaling, structure integrity is a problem with polymer-based NF and RO membranes, which can make operations complicated and time-consuming.

If the water effluent from the desalter is not treated, the high usage of fresh water can eventually deplete the groundwater resources or require desalinated water from the sea to be transported to a plant location. Costs can be significantly high for plants located far from sea water sources. Moreover, seawater has much greater salinity (for example, 40,000-60,000 ppm) than desalter water effluent (for example, 6,000-16,000 ppm).

SUMMARY

The present disclosure describes techniques that can be used for treating desalter water effluent for wash water reuse in Gas and Oil Separation Plants (GOSPs). The treatment can include a filtering system that uses a ceramic nanofiltration (NF) membrane, for example.

In some implementations, a GOSP-embedded treatment system for recycling desalter wash water can include the following: 1) an inlet system providing an inlet stream of desalter water effluent received from at least one desalter of a source; 2) a filtering system in the GOSP including a NF membrane configured to filter the desalter water effluent to attain filtered desalter water effluent within a pre-determined wash water threshold for wash water reuse, including: partially desalinating the desalter water effluent to attain a Total Dissolved Solids (TDS) of the desalter water effluent within a pre-determined TDS threshold; and 3) a pump system configured to pump the desalter water effluent through the NF membrane and pump the filtered desalter water effluent to a supply line of the desalter.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, commercial multi-process configurations for treating desalter water effluent can be replaced with a single step system for treating and recycling desalter water effluent. Second, using the single step system can eliminate the need for pre-treatment processes that conventional configurations typically rely on for protecting reverse osmosis (RO) components from harsh conditions, including organics, high temperature, fouling, and scaling potential. Third, using the single step system can eliminate operator errors that may lead to accidental high-temperature or oxidizing conditions that can rapidly degrade RO membranes. Fourth, a single step system can provide simplified operation by users and can be integrated seamlessly with existing facilities. Fifth, re-using wash water by re-using treated wash water effluent can extend water cycles at oil production plants. Sixth, treating desalter water effluent and reusing the water in place of fresh water reduces business costs and helps the environment. Seventh, techniques of the present disclosure can be used to treat and reuse the water from a desalter outlet and reduce the amount of fresh water required by the GOSP. Eighth, ceramic NF membranes can be allowed to become completely dry and can then be re-used, which gives a great operational flexibility and makes the maintenance easier for operations and maintenance team. Ninth, ceramic NF membranes can tolerate 500 to 1,000 part per million (ppm) of chlorine, allowing ceramic membranes to be cleaned up to remove fouling layers. Tenth, recycling desalter water effluent can conserve groundwater resources and avoid building costly seawater desalination plants and pipelines to deliver desalinated water to GOSPs.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for treating desalter water effluent for wash water reuse in Gas and Oil Separation Plant (GOSPs). Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Although GOSPs using desalters have existed for decades, the generally accepted belief has been that recycling desalter water effluent is not economically feasible due to the technical challenges of temperature, ion removal, and polymeric material degradation. Previous recycling attempts have included elaborate systems and high costs of operation and maintenance.

In some implementations, treatment techniques can use filtering systems that include ceramic nanofiltration (NF) membranes used to produce cleaner water from desalter water for wash water reuse in GOSP systems. Such techniques can include filtering systems that include: 1) an exact location for placement at a GOSP, 2) a specific method of reducing fresh water consumption, and 3) a specific target goal of the treatment and reuse of water. The techniques can provide an efficient treatment and reuse of a desalter water effluent stream, which is not generally practiced in conventional systems due to technical challenges.

Ceramic membranes can solve many of the limitations and weaknesses of reverse osmosis (RO) used in some filtering techniques. However, commercially available ceramic membranes are typically limited to microfiltration (MF) and ultrafiltration (UF) and not used to reduce the Total Dissolved Solids (TDS) and organics content in the feed water. Commercially available ceramic NF membranes can be considered currently to be primarily in the development stage and have not been designed or used for water treatment, such as for desalter water effluent. The use of ceramic membranes as described in the present disclosure can reduce the amount of fresh water used in the desalter by treating the water effluent (which is typically disposed of with no beneficial use or re-use). The use of ceramic NF membranes can overcome the limitations of current water treatment technologies that typically make desalter water reuse impractical and inefficient.

Figure 1:
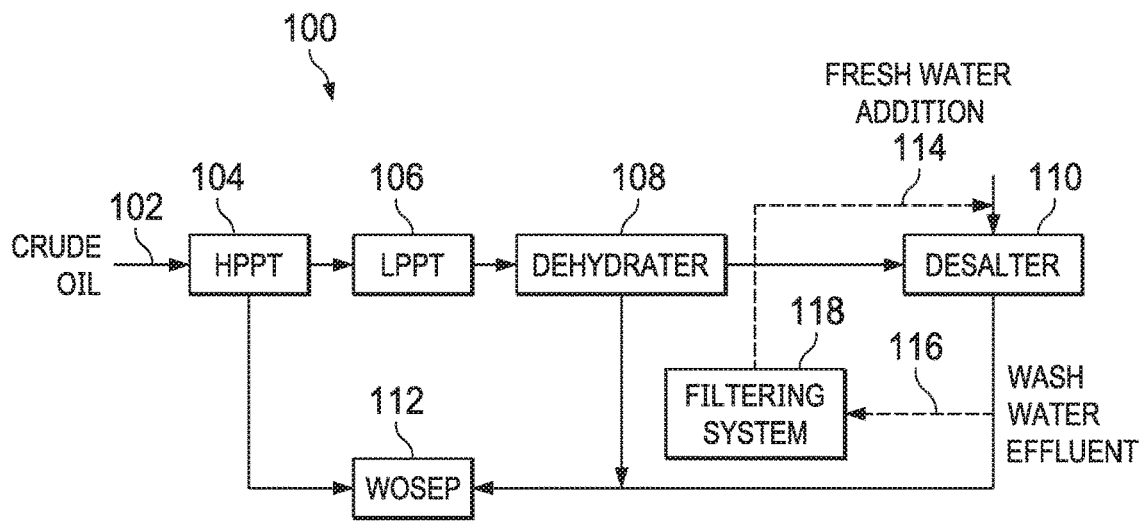
FIG. 1 is a flow diagram of an example of a typical Gas-Oil Separation Plant (GOSP) and a potential location for water treatment units, according to some implementations of the present disclosure.

FIG. 1 is a flow diagram of an example of a Gas-Oil Separation Plant (GOSP) 100 and a potential location for water treatment units, according to some implementations of the present disclosure. While FIG. 1 represents an onshore configuration, other layouts can be used for offshore crude oil production and oil-gas production that include some or all of the features of FIG. 1. In this example, Crude oil 102 enters a high pressure production trap (HPPT) 104 for processing. Further processing of the crude oil occurs in a low pressure production trap (LPPT) 106 before the crude oil enters a dehydrator 108 and finally a desalter 110. After being mixed with the crude oil inside the desalter vessel, the used wash water enters a Water/Oil Separator (WOSEP) 112 where it is separated from the suspended organic contaminants it carries, essentially oil droplets, by gravity. The techniques on which the present disclosure focuses occur in proximity to (and with respect to) the desalter 110. Specifically, in order to reduce the amount of fresh water addition 114 used in desalting, wash water effluent 116 is filtered by a filtering system 118.

In some implementations, the filtering system 118 can be a GOSP-embedded treatment system for recycling desalter wash water (for example, recycling the wash water effluent 116). The NF membrane of the GOSP-embedded treatment system can have a temperature tolerance of up to 200 degrees Celsius (° C.), for example. The filtering system 118 can include an inlet system that provides an inlet stream of desalter water effluent received from at least one desalter of a source (for example, the GOSP). The inlet system can include at least one pump. The filtering system 118 can be a filtering system in the GOSP and can include an NF membrane (for example, a ceramic NF membrane). The NF membrane can be configured to filter the desalter water effluent to attain filtered desalter water effluent within a pre-determined wash water threshold for wash water reuse. For example, the pre-determined wash water threshold can be a 50% reduction of fresh water consumption by the GOSP. The NF membrane can provide a Molecular Weight Cut-Off (MWCO), for example, of up to 15,000 Dalton. In a preferred embodiment, the NF membrane or the ceramic NF membrane can provide a MWCO in the range [100-300] Dalton.

Filtering performed by the filtering system 118 can include partially desalinating the desalter water effluent to attain a TDS of the desalter water effluent within a pre-determined TDS threshold (for example, 1,650 parts per million (ppm)). The filtering system 118 can include a pump system configured to: 1) pump the desalter water effluent through the NF membrane; and 2) pump the filtered desalter water effluent to a supply line of the desalter.

In some implementations, the filtering system can include a dead-end configuration of the Ceramic NF membrane in which the Ceramic NF membrane is cleaned after a period of use (for example, a pre-determined number of days or weeks, or a pre-determined number of service hours). In other implementations, the filtering system can include a cross-flow membrane configuration of the NF membrane (for example, in which case the NF membrane is periodically cleaned or swapped with a cleaned membrane).

Figure 2A:
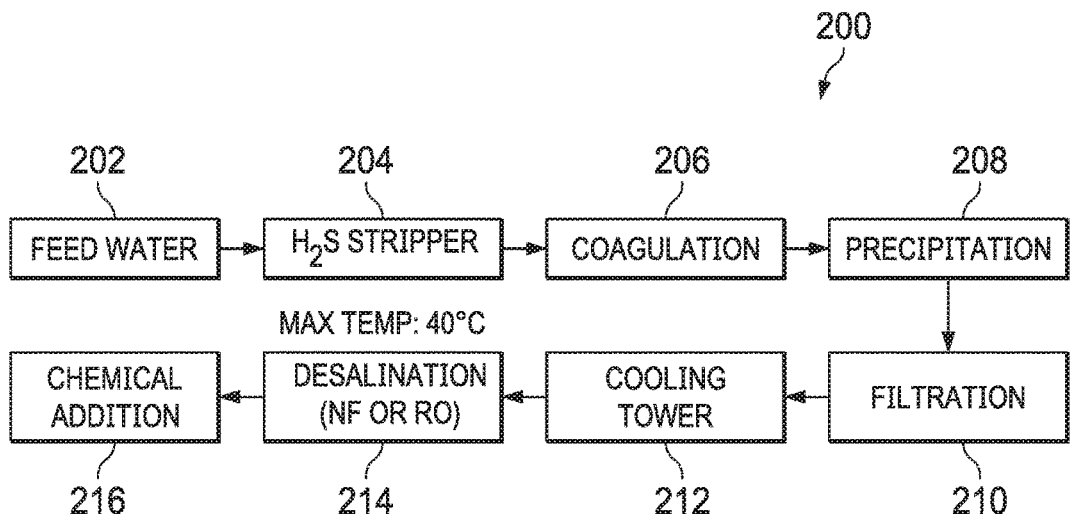
FIG. 2A is a flow diagram of an example of a conventional treatment system, according to some implementations of the present disclosure.

FIG. 2A is a flow diagram of an example of a conventional treatment system 200, according to some implementations of the present disclosure. In the conventional treatment system 200, feed water 202 is processed by a Hydrogen Sulfide (H2S) stripper 204, after which coagulation 206, precipitation 208, and filtration 210 occur. After the water is processed by a cooling tower 212, desalination 214 occurs. The desalination 214 can use polymeric NF or RO, typically occurring at maximum (max.) temperature of 40° C. After desalination, the water receives a chemical addition 216.

Figure 2B:
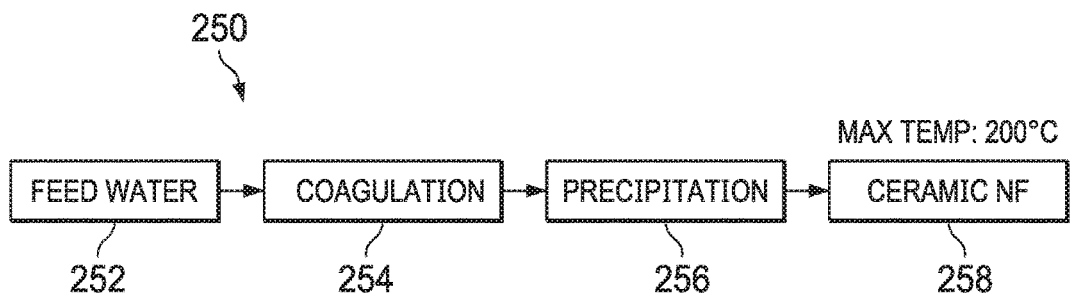
FIG. 2B is a flow diagram of an example of filtering system, according to some implementations of the present disclosure.

FIG. 2B is a flow diagram of an example of a filtering system 250, according to some implementations of the present disclosure. Feed water 252 is processed in coagulation 254 and precipitation 256 steps before ceramic nanofiltration 258 occurs. A benefit of the filtering system 250 of the present disclosure is that ceramic nanofiltration membranes 258 can take temperatures up to approximately 200° C. and have excellent resistance to strongly acidic and basic conditions. This provides the option for implementing very efficient, high temperature chemical cleaning procedures that are not feasible with polymeric membranes. The feasibility of high temperature, chemicals for membrane cleaning is, in turn, allowing the implementation of short duration, clean-in-place procedures which maximizes the membrane uptime ratio and, thus give an added competitive advantage to the method according to the present invention over conventional techniques. When presented together, FIGS. 2A and 2B show a comparison between a conventional water treatment process and a water treatment process described by the present disclosure.

The filtering system 250 shown in FIG. 2B uses ceramic NF membrane, which addresses problems associated with conventional treatment technologies (for example, that use polymer-based NF or RO). For example, use of the ceramic NF membrane in the filtering system 250 can provide: 1) temperature tolerance, 2) petro-organics compatibility, 3) oxidizer tolerance, and 4) drying compatibility of the membranes. Ceramic NF materials are tolerant to $H_2S$ which polymeric membranes are not, and since ceramic NF materials do not require air stripping or cooling tower, no oxygen is added to the stream that requires scavenging. In comparison, even the best available conventional technologies, if combined in multiple processes to protect the polymer-based NF or RO, can result in components that need to be replaced frequently. In such conventional technologies, the re-use of desalter water effluent can typically be challenging and impractical.

Ceramic membranes have been used conventionally in MF and UF applications. Ceramic membranes can withstand temperatures up to 200° C. However, MF and UF applications typically cannot remove ions. Ceramic NF membranes are recent entries into the ceramic membranes space, having the ability to remove ions as well as organics. However, ceramic membranes have not entered the mainstream of oil production processes, and as such, have not been considered for treating desalter effluent. Ceramic NF membranes can solve the technical problems associated with current technologies, while simplifying processes and making replacement of membranes a less frequent requirement.

Ceramic membranes that are typically used in MF or UF applications are typically used to de-oil produced water only when the water is combined with a chemical injection such as a coagulant. However, ceramic MF and UF membranes are not capable of reducing TDS concentrations or ions in the produced water. As a result, typical field applications of ceramic membranes are limited only to solid particle filtration and suspended oil droplets removal. Techniques of the present disclosure include the use of NF with ceramic materials that allow simultaneous removal of particles, oil, and ions. This type of simultaneous removal is not possible with conventional single-step membrane processes.

Techniques of the present disclosure can be used to achieve target thresholds for water filtration. The typical TDS of desalter water effluent is 6,000-16,000 ppm, and the target for re-use of desalter water effluent is less than 1,650 ppm. Also, the average oil in water content is 50-200 ppm, while an industry target for water disposal in the environment is less than 10 ppm, though techniques of the present disclosure do not include discharge into the environment at that concentration.

Techniques described in the present disclosure rely on experimental observations showing that ceramic NF membrane can partially desalinate the water and can de-oil the desalter water effluent. Further, the observation can show that wash water specifications are reached with lesser costs than technologies available on the market. The techniques described in the present disclosure can provide a process for producing water for reuse (for example, to enable recycling). The ceramic membrane material can treat high-temperature, high-pressure water reaching temperatures up to 200° C. The ceramic membrane material can also have a high resistance to dissolved sour gases, which can provide an important competitive advantage of longer lifetimes over conventional polymer membranes.

The present disclosure includes techniques that enable the reuse and recycling of the desalter water effluent at GOSPs. Crude oil at GOSPs includes impurities that need to be removed before the product can be ready for sale or further processing at refineries. Two major contaminants to be removed are salts and water. Conventional desalting techniques typically rely completely on fresh water to wash the oil. The washing can reduce the salt (ions) concentration in the oil phase as well as the salt in the small droplets of water phase in the oil. During the desalting process, a high volume of fresh water is required to clean up the oil phase in a desalter vessel followed by a dehydrator to produce crude oil to export specifications (typically, 0.2% volume residual water content and 10 Pounds per Thousand Barrels (PTB) salt content). The volume ratio of the fresh water used for desalting is usually between 2% and 10% of the crude oil volume to be desalted. Used wash water from the desalter effluent is high in salt concentration and cannot be further reused in that state. Therefore, a continuous stream of fresh water is needed for continuous cleaning of the crude oil. Supplies of fresh water in areas where water is scarce can increase the oil production costs and can lead to the depletion of groundwater resources. This can have serious long-term effects on water supplies in the environment. As such, a significant benefit can be gained if at least some of the water can be treated and reused to reduce the amount of fresh water that is used. Another significant benefit is the cost savings reached by reducing the volume of wash water effluent to be disposed of.

To enable reuse of the desalter outlet water stream, the salt concentration and the organics concentration need to be reduced. Conventional techniques typically cannot attain acceptable water quality with a reasonable effort. This is because conventional techniques for salt removal use RO or NF. These techniques cannot be applied in many produced water sites due to high temperatures and damage to polymers by the organics contaminants in the feed water. In order to achieve better results in the treatment of desalter water effluent, non-conventional techniques are needed. The present disclosure describes the use of a class of membranes made of ceramic (or some other high temperature and chemically resistant material).

Typical oilfield produced water (PW) contains high TDS and organics. Desalter water effluent has lower salinity (6,000 to 16,000 ppm) than PW, which would make it easier to treat for reuse. However, there are several problems with the general quality of this stream and the treatment process that makes it incompatible with current technologies. Issues that are to be considered when considering technologies for treating desalter water effluent include the following.

A first issue is that desalter water outlets in general have a greater temperature (for example, up to 70° C.) as compared to the temperature tolerance (for example, 40° C. maximum) of general RO or NF materials. As a result, before being used in conventional water treatment technologies, the desalter water effluent needs be treated in multiple processes or stages, as described in part with reference to FIG. 2A. For example, first steps can include the use of a coagulation system with organics removal followed by a settler (or a gravity separator) or a membrane. Additional steps can include use of an air stripping system to remove $H_2S$ and a cooling system that are necessary to bring the temperature to less than approximately 38° C. Only after these steps can the water be processed with RO. As a consequence, it is necessary to provide an additional treatment step to add costly oxygen scavenger and biocide chemicals in the desalinated water before the water can be re-used in the GOSP desalting process. Even using these techniques, it is not possible to treat water having TDS values greater than 60,000 ppm.

A second issue is that the organics in the oily produced water are known to damage polymer-based RO and NF membranes that are currently used for desalination. For example, certain components in the produced water can dissolve the backbone structure of the membranes, requiring frequent replacement of the membranes. This can lead to a service period of membranes that is ten times shorter than when used with seawater, for example. As a consequence, it is necessary to provide additional steps to reduce the organics concentration in the feed water upstream of the polymer-based RO or NF.

A third issue is that conventional membranes are extremely sensitive to oxidizing chemicals used to clean fouling. Even a few ppm of chlorine can damage polymer-based RO and NF within seconds.

A fourth issue is that polymer-based membranes need to be wetted all the time. This is necessary because after a period of non-operation during which the membranes dry up, the structure of the membrane will collapse and needs to be replaced.

These issues can be solved by techniques described in the present disclosure. For example, ceramic nanofilters or nanofiltration can be used to remove organics and TDS from produced water, down to levels sufficient for reuse in oil production. Ceramic NF materials have a high tolerance for temperature (for example, up to 200° C.) as compared to conventional polymer-based membranes and there is no need for using a cooling system prior to the membrane. The ceramic NF materials are also capable of withstanding high concentrations of oxidizing chemicals for cleaning so that the organic fouling or inorganic scaling on the membrane surface can be easily removed during cleaning cycles. Ceramic NF materials are tolerant to $H_2S$ which polymeric membranes are not, and since ceramic NF materials do not require air stripping or cooling tower, no oxygen is added to the stream that requires scavenging. Also, ceramic NF membranes can be completely dried and then put back to use with no issues. As a result, using ceramic NF membranes not only solves technical issues but also supports flexible operations including tolerating process shutdowns, upsets, or operator errors.

Examples of membranes suitable for use in techniques of the present disclosure include, but are not limited to, Cerahelix (U.S. Pat. No. 8,431,508—"Inorganic Structure for Molecular Separations" and U.S. Pat. No. 8,426,333—"Structure For Molecular Separations") and Inopor (WO2004076041A1—"Ceramic Nanofiltration Membrane for Use in Organic Solvents and Method for the Production Thereof"). Such membranes can be placed, for example, in the filtering system 118 of the GOSP 100.

Table 1 lists examples of values for analytical characteristics of a typical wash water effluent and a high-salinity oilfield produced water sampled at an oil production plant.

TABLE 1

Physical properties and inorganic composition of used wash water and produced water

| Parameter | Wash Water Effluent | High TDS Produced Water (ZA) |
|---|---|---|
| pH (per-Hydrogen) | 7.3 | 4.7 |
| Conductivity (ms/cm) (millisiemens/centimeter) | 32.4 | 681 |
| TDS (g/L) (gallons/liter) | 16.2 | 339 |
| TOC (0.45 µm GF; mg/L) | 2.1 | 50.8 |
| Total oil (Hexane extract; UV 227.5 nm; mg/L)* | 0.017 | 3.32 |
| Average particle size (µm) (micrometers) | 15 | 1.1 |
| Fluoride (mg/L) | 0.9 | 0.3 |
| Chloride (mg/L) | 4,489 | 56,972 |
| Bromide (mg/L) | 1,146 | — |
| Nitrate (mg/L) | 42 | 305 |
| Phosphate (mg/L) | 2.4 | — |
| Sulfate (mg/L) | 11.5 | — |
| Aluminum (mg/L) | 0.26 | 0.94 |
| Arsenic (µg/L) (micrograms/liter) | 7.9 | 13 |
| Barium (mg/L) | 0.11 | 3.36 |
| Calcium (mg/L) | 761 | 5,531 |
| Cadmium (µg/L) | — | 2.0 |
| Chromium (µg/L) | 1.3 | 9.4 |
| Copper (µg/L) | 25 | 55 |
| Iron (mg/L) | 0.07 | 6.2 |
| Potassium (mg/L) | 134 | 1476 |
| Lithium (mg/L) | 1.5 | 4.9 |
| Magnesium (mg/L) | 102 | 888 |
| Manganese (mg/L) | 0.48 | 4.3 |
| Sodium (mg/L) | 2,098 | 22,127 |
| Lead (µg/L) | 12 | 51 |
| Sulfur (mg/L) | 411 | 89 |
| Strontium (mg/L) | 20.4 | 218 |
| Titanium (µg/L) | 4.9 | 21 |
| Vanadium (mg/L) | 0.4 | 4.5 |
| Zinc (µg/L) | 4.6 | 69 |

Experimental Data

In order to test the techniques described in the present disclosure, a small pilot unit was built for initial testing. Ceramic membranes with a MWCO down to 150 Dalton were tested in laboratory conditions. Testing successfully showed evidence of partial desalination of PW samples together with efficient de-oiling performance in dead-end and cross-flow membrane configurations. Additional test phases can be used to test the process in a larger pilot unit installed at a crude oil processing facility.

Figure 3:
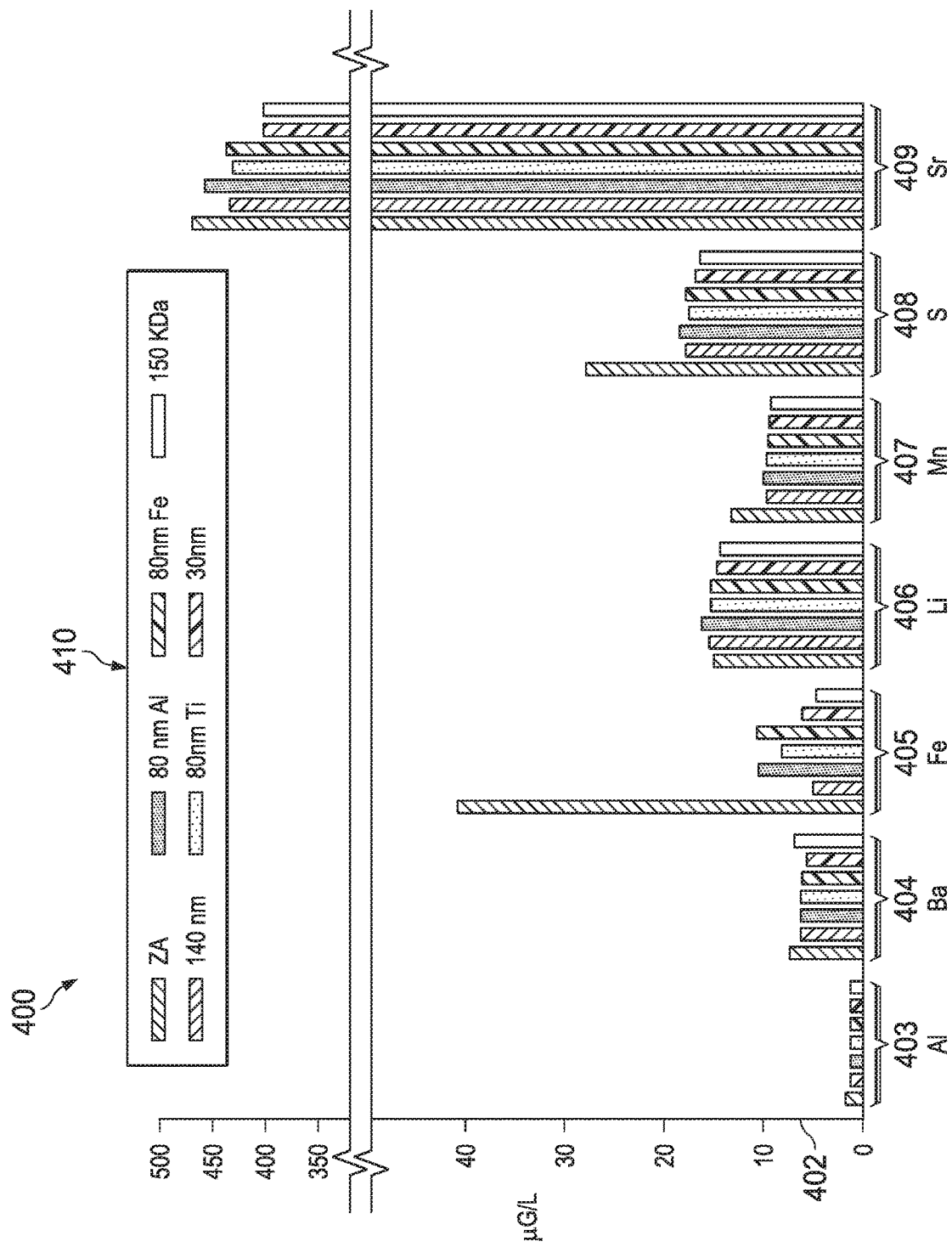
FIG. 3 is a graph showing an example of experimental data on partial desalination obtained with different ceramic membranes in laboratory conditions, according to some implementations of the present disclosure.

FIG. 3 is a graph 400 showing an example of experimental data on partial desalination obtained with different ceramic membranes in laboratory conditions, according to some implementations of the present disclosure. Concentrations are plotted relative to micrograms/liter (µg/L) y-axis 402. Concentrations 403-409 are plotted for the elements Aluminum (Al), Barium (Ba), Iron (Fe), Lithium (Li), Manganese (Mn), Sulfur (S), and Strontium (Sr), respectively. Legend 410 identifies bar fill patterns associated with bars in the graph 400 for high TDS produced water (for a sample named ZA), a 140 nm filter, an 80 nm Al filter, an 80 nm Ti filter, an 80 nm Fe filter, a 30 nm filter, and a 150 kDalton filter.

Figure 4:
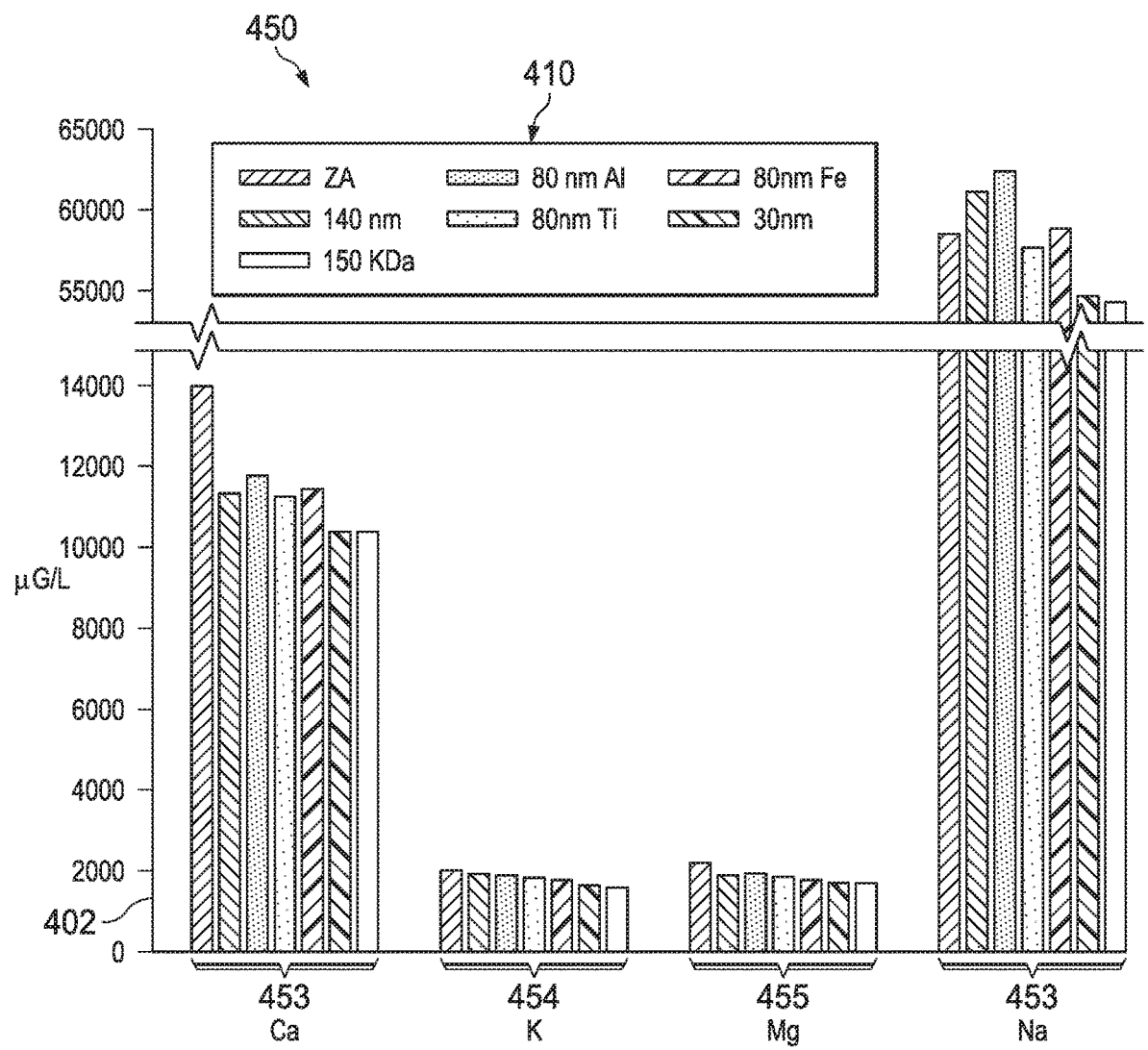
FIG. 4 is a graph showing an example of measured concentrations of inorganic constituents in PW and its permeate from different ceramic membranes, according to some implementations of the present disclosure.

FIG. 4 is a graph 450 showing an example of measured concentrations of inorganic constituents in PW and its permeate from different ceramic membranes, according to some implementations of the present disclosure. Concentrations 453-456 are plotted for the elements Calcium (Ca) 453, potassium (K) 454, magnesium (Mg) 455, and sodium (Na) 456, respectively.

Figure 5:
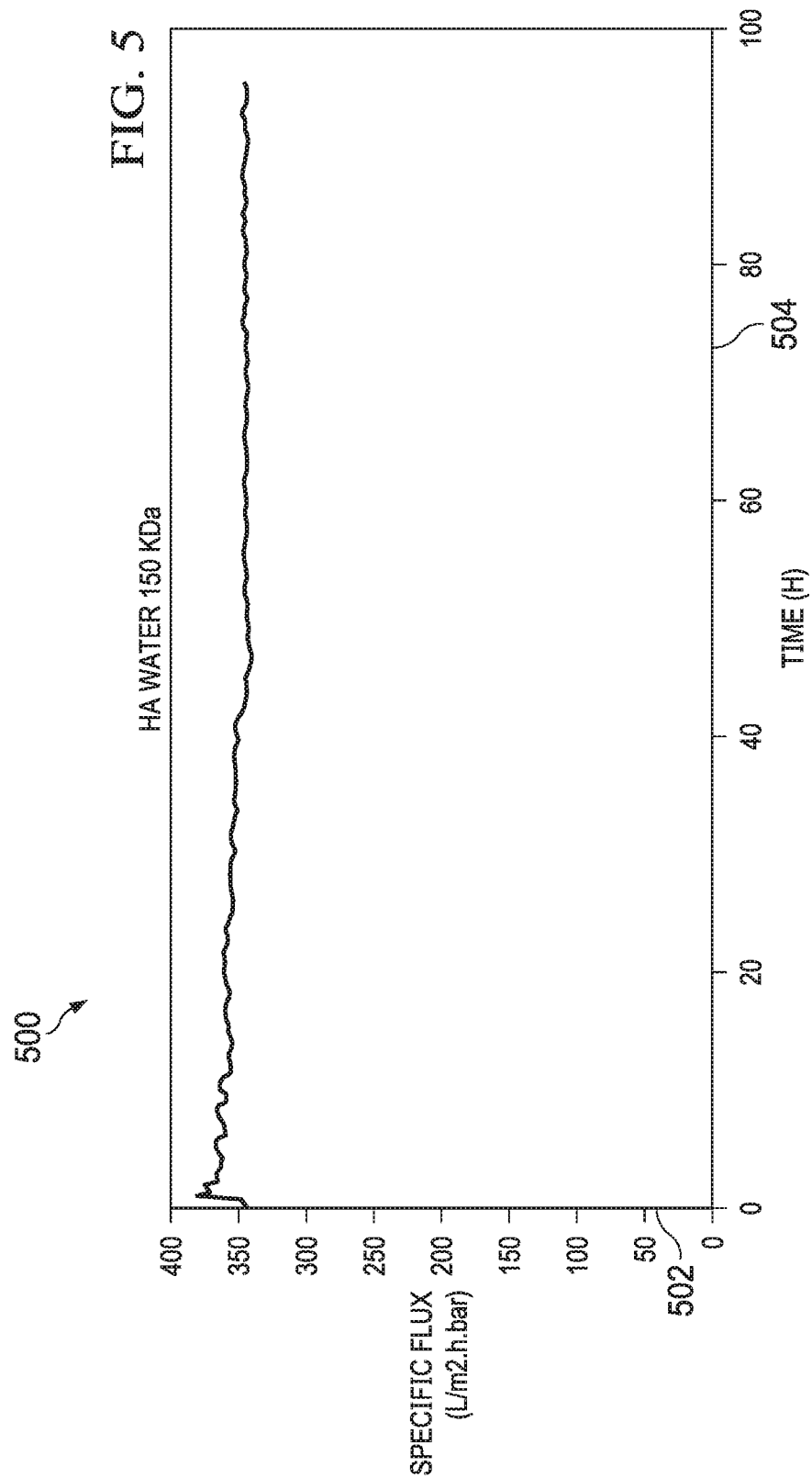
FIG. 5 is a graph plotting example values for a commercial 150-Dalton ceramic membrane tested in a cross-flow process, according to some implementations of the present disclosure.

FIG. 5 is a graph 500 plotting example values for a commercial 150-Dalton ceramic membrane tested in a cross-flow process, according to some implementations of the present disclosure. The graph 500 provides evidence of a successful experimental process configuration in which sampled wash-water effluent retained its specific flux characteristics over a 100-hour period of time (for a sample named HA). The graph 500 supports the feasibility of the processes associated with the present disclosure. The graph 500 is a plot relative to a specific flux axis 502 over time in hours (h) (x-axis 504), for example, in flux units of $L/h·m^2·bar$ (liters/hour meters squared bar (transmembrane pressure)).

Figure 6:
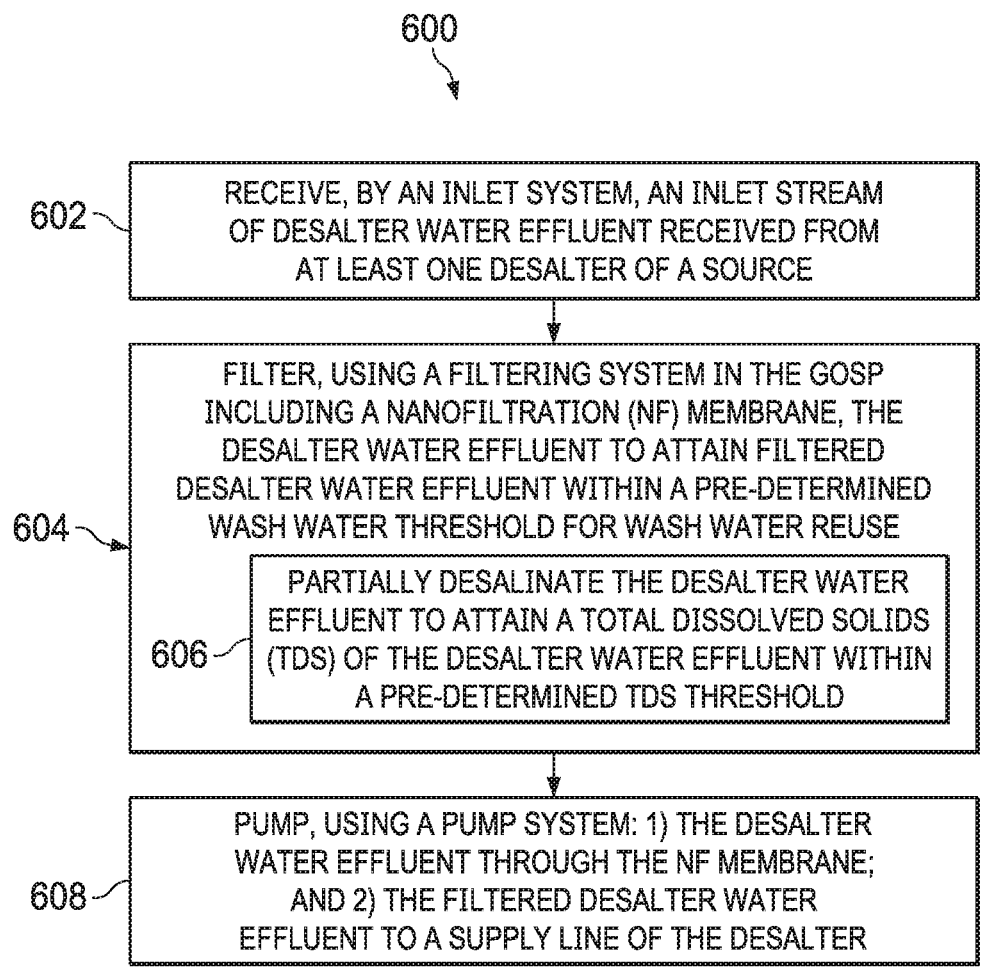
FIG. 6 is a flowchart of an example of a method used by a GOSP-embedded treatment system for recycling desalter wash water, according to some implementations of the present disclosure.

FIG. 6 is a flowchart of an example of a method 600 used by a GOSP-embedded treatment system for recycling desalter wash water, according to some implementations of the present disclosure. In some implementations, the NF membrane of the GOSP-embedded treatment system can have a temperature tolerance of up to 200 degrees C. The NF membrane can operate at temperatures above 40 degrees Celsius C). For clarity of presentation, the description that follows generally describes method 600 in the context of the other figures in this description. However, it will be understood that method 600 can be performed, for example, by any suitable system, environment, software, and hardware, or a combination of systems, environments, software, and hardware, as appropriate. In some implementations, various steps of method 600 can be run in parallel, in combination, in loops, or in any order.

At 602, an inlet stream of desalter water effluent is received by an inlet system from at least one desalter of a source. As an example, the inlet system can include at least one pump, and the source can be the GOSP. From 602, method 600 proceeds to 604.

At 604, the desalter water effluent is filtered using a filtering system in the GOSP including an NF membrane (for example, a ceramic NF membrane) to attain filtered desalter water effluent within a pre-determined wash water threshold for wash water reuse. The NF membrane provides a MWCO, for example, of up to 15,000 Dalton. The pre-determined wash water threshold can be, for example, a 50% reduction of fresh water consumption by the GOSP. In some implementations, the filtering system can include a dead-end configuration of the NF membrane in which the NF membrane is cleaned after a period of use. In some implementations, the filtering system includes a cross-flow membrane configuration of the NF membrane. Step 604 includes steps 606 and 608, for example.

At 606, the desalter water effluent is partially desalinated to attain a TDS of the desalter water effluent within a pre-determined TDS threshold (for example, 1,650 ppm). From 604, method 600 proceeds to 610.

At 610, the desalter water effluent is pumped, using a pump system, through the NF membrane; and 2) the filtered desalter water effluent is pumped, using the pump system, to a supply line of the desalter. After 610, method 600 can stop.

Figure 7:
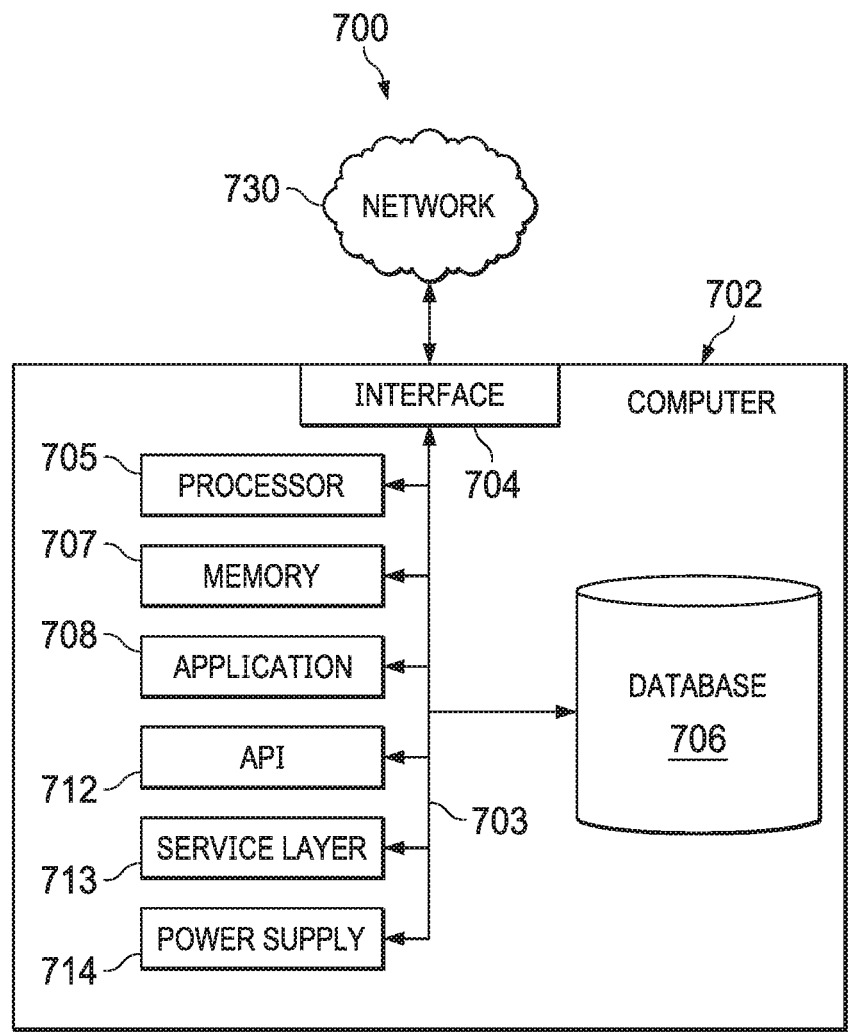
FIG. 7 is a block diagram illustrating an example computer system used to provide computational functionalities associated with described algorithms, methods, functions, processes, flows, and procedures as described in the present disclosure, according to some implementations of the present disclosure.

FIG. 7 is a block diagram of an example computer system 700 used to provide computational functionalities associated with described algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a top level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both) over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Described implementations of the subject matter can include one or more features, alone or in combination.

For example, in a first implementation, a GOSP-embedded treatment system for recycling desalter wash water can include the following: 1) an inlet system providing an inlet stream of desalter water effluent received from at least one desalter of a source; 2) a filtering system in the GOSP including a NF membrane configured to filter the desalter water effluent to attain filtered desalter water effluent within a pre-determined wash water threshold for wash water reuse, including: partially desalinating the desalter water effluent to attain a Total Dissolved Solids (TDS) of the desalter water effluent within a pre-determined TDS threshold; and 3) a pump system configured to pump the desalter water effluent through the NF membrane and pump the filtered desalter water effluent to a supply line of the desalter.

The foregoing and other described implementations can each, optionally, include one or more of the following features:

A first feature, combinable with any of the following features, where the pre-determined wash water threshold is a 50% reduction of fresh water consumption by the GOSP.

A second feature, combinable with any of the previous or following features, where the NF membrane is operating at temperatures above 40 degrees Celsius (° C.).

A third feature, combinable with any of the previous or following features, where the NF membrane provides a Molecular Weight Cut-Off (MWCO) of up to 15,000 Dalton.

A fourth feature, combinable with any of the previous or following features, where the NF membrane has a MWCO in the range from 100 Dalton to 300 Dalton.

A fifth feature, combinable with any of the previous or following features, where the filtering system includes a dead-end configuration of the NF membrane in which the NF membrane is cleaned after a period of use.

A sixth feature, combinable with any of the previous or following features, where the filtering system includes a cross-flow membrane configuration of the NF membrane.

A seventh feature, combinable with any of the previous or following features, where the pre-determined TDS threshold is lower than 8,000 parts per million (ppm).

An eighth feature, combinable with any of the previous or following features, where the NF membrane is a ceramic NF membrane.

A ninth feature, combinable with any of the previous or following features, where the inlet system includes at least one pump, and wherein the source is the GOSP.

In a second implementation, a computer-implemented method of a Gas-Oil Separation Plant (GOSP)-embedded treatment system for recycling desalter wash water can include the following. An inlet stream of desalter water effluent is received by an inlet system from at least one desalter of a source. Using a filtering system in the GOSP including a nanofiltration (NF) membrane, the desalter water effluent is filtered to attain filtered desalter water effluent within a pre-determined wash water threshold for wash water reuse. The filtering includes partially desalinating the desalter water effluent to attain a Total Dissolved Solids (TDS) of the desalter water effluent within a pre-determined TDS threshold. Using a pump system, the desalter water effluent is pumped through the NF membrane, and the filtered desalter water effluent is pumped to a supply line of the desalter.

The foregoing and other described implementations can each, optionally, include one or more of the following features:

A first feature, combinable with any of the following features, where the pre-determined wash water threshold is a 50% reduction of fresh water consumption by the GOSP.

A second feature, combinable with any of the previous or following features, where the NF membrane is operating at temperatures above 40 degrees Celsius (° C.).

A third feature, combinable with any of the previous or following features, where the NF membrane provides a Molecular Weight Cut-Off (MWCO) of up to 15,000 Dalton.

A fourth feature, combinable with any of the previous or following features, where the NF membrane has a MWCO in the range from 100 Dalton to 300 Dalton.

In a third implementation, a non-transitory, computer-readable medium storing one or more instructions executable by a computer system to perform operations including the following: An inlet stream of desalter water effluent is received by an inlet system from at least one desalter of a source. Using a filtering system in the GOSP including a nanofiltration (NF) membrane, the desalter water effluent is filtered to attain filtered desalter water effluent within a pre-determined wash water threshold for wash water reuse. The filtering includes partially desalinating the desalter water effluent to attain a Total Dissolved Solids (TDS) of the desalter water effluent within a pre-determined TDS threshold. Using a pump system, the desalter water effluent is pumped through the NF membrane, and the filtered desalter water effluent is pumped to a supply line of the desalter.

The foregoing and other described implementations can each, optionally, include one or more of the following features:

A first feature, combinable with any of the following features, where the pre-determined wash water threshold is a 50% reduction of fresh water consumption by the GOSP.

A second feature, combinable with any of the previous or following features, where the NF membrane is operating at temperatures above 40 degrees Celsius (° C.).

A third feature, combinable with any of the previous or following features, where the NF membrane provides a Molecular Weight Cut-Off (MWCO) of up to 15,000 Dalton.

A fourth feature, combinable with any of the previous or following features, where the NF membrane has a MWCO in the range from 100 Dalton to 300 Dalton.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A method of a Gas-Oil Separation Plant (GOSP)-embedded treatment system for recycling desalter wash water, comprising:

receiving, by an inlet system at the GOSP, an inlet stream of desalter water effluent received from at least one desalter of a source;

filtering, in response to receiving the an inlet stream of desalter water and using a filtering system in the GOSP including a nanofiltration (NF) membrane, the desalter water effluent to attain filtered desalter water effluent within a pre-determined wash water threshold for wash water reuse, including:

partially desalinating the desalter water effluent to attain a Total Dissolved Solids (TDS) of the desalter water effluent within a pre-determined TDS threshold; and pumping, using a pump system of the GOSP: 1) the desalter water effluent through the NF membrane; and 2) the filtered desalter water effluent to a supply line of the desalter.

2. The method of claim 1, wherein the pre-determined wash water threshold is a 50% reduction of fresh water consumption by the GOSP.

3. The method of claim 1, wherein the NF membrane is operating at temperatures above 40 degrees Celsius (° C.).

4. The method of claim 1, wherein the NF membrane provides a Molecular Weight Cut-Off (MWCO) of up to 15,000 Dalton.

5. The method of claim 1, wherein the NF membrane has a MWCO in a range from 100 Dalton to 300 Dalton.

6. The method of claim 1, wherein the filtering system includes a dead-end configuration of the NF membrane in which the NF membrane is cleaned after a period of use.

7. The method of claim 1, wherein the filtering system includes a cross-flow membrane configuration of the NF membrane.

8. The method of claim 1, wherein the pre-determined TDS threshold is lower than 8,000 parts per million (ppm).

9. The method of claim 1, wherein the NF membrane is a ceramic NF membrane.

10. The method of claim 1, wherein the inlet system includes at least one pump, and wherein the source is the GOSP.

* * * * *

UNITED STATES PATENT AND TRADEMARK OFFICE
CERTIFICATE OF CORRECTION

PATENT NO. : 11,148,962 B2  
APPLICATION NO. : 16/787866  
DATED : October 19, 2021  
INVENTOR(S) : AlGhunaimi et al.

Page 1 of 1

It is certified that error appears in the above-identified patent and that said Letters Patent is hereby corrected as shown below:

In the Claims

Column 18, Line 66, Claim 1, delete "the an" and insert -- an --.

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*